United States Patent
Shen

(10) Patent No.: US 11,503,566 B2
(45) Date of Patent: Nov. 15, 2022

(54) RESOURCE CONFIGURATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 715 days.

(21) Appl. No.: 16/331,495

(22) PCT Filed: Jan. 11, 2018

(86) PCT No.: PCT/CN2018/072265
§ 371 (c)(1),
(2) Date: Mar. 7, 2019

(87) PCT Pub. No.: WO2019/136666
PCT Pub. Date: Jul. 18, 2019

(65) Prior Publication Data
US 2021/0337510 A1  Oct. 28, 2021

(51) Int. Cl.
*H04W 72/02* (2009.01)
*H04W 72/04* (2009.01)

(52) U.S. Cl.
CPC ......... *H04W 72/02* (2013.01); *H04W 72/042* (2013.01); *H04W 72/0446* (2013.01)

(58) Field of Classification Search
None
See application file for complete search history.

(56) References Cited

U.S. PATENT DOCUMENTS

2013/0336299 A1* 12/2013 Lee ................ H04L 5/0055
370/336
2014/0086112 A1* 3/2014 Stern-Berkowitz .........
H04L 1/1822
370/280
(Continued)

FOREIGN PATENT DOCUMENTS

CN  103517422 A  1/2014
CN  104349460 A  2/2015
(Continued)

OTHER PUBLICATIONS

Source; ZTE et al, Title; Remaining details on group-common PDCCH. 3GPP Draft; R1-1719670 Remaining details on group-common PDCCH, 3rd generation partnership project(3GPP), Mobile competence centre; 650, route des lucioles; F-06921 Sophia-antipolis cedex; France. vol. RAN WG1, No. Reno, USA. Nov. 27-Dec. 1, 2017. Route Des Lucioles. Nov. 18, 2017. XP051369468.
(Continued)

*Primary Examiner* — Duc T Duong
(74) *Attorney, Agent, or Firm* — Ladas & Parry LLP

(57) ABSTRACT

A resource configuration method and device and a computer storage medium are provided. The method includes that: a terminal receives first configuration information and/or second configuration information sent by a network device, the first configuration information being configured to indicate a first time period corresponding to a first search space and the second configuration information being configured to indicate a second time period corresponding to first Up Link (UL)/Down Link (DL) configuration information; and the terminal receives the first UL/DL configuration information based on a time period corresponding to the target configuration information.

11 Claims, 5 Drawing Sheets

---

Receive, by a terminal, first configuration information and/or second configuration information sent by a network device, the first configuration information being configured to indicate a first time period corresponding to a first search space and the second configuration information being configured to indicate a second time period corresponding to first UL/DL configuration information — 101

Select, by the terminal, one piece of configuration information from the first configuration information and/or the second configuration information as target configuration information, and receive, by the terminal, the first UL/DL configuration information based on a time period corresponding to the target configuration information — 102

(56) References Cited

U.S. PATENT DOCUMENTS

| | | |
|---|---|---|
| 2015/0208382 A1 | 7/2015 | Yao et al. |
| 2016/0183222 A1* | 6/2016 | Suzuki ............... H04W 72/042 370/280 |
| 2017/0041905 A1* | 2/2017 | Chen ................... H04W 24/00 |
| 2018/0014283 A1 | 1/2018 | You et al. |
| 2019/0089584 A1* | 3/2019 | Islam ................. H04L 41/0803 |
| 2019/0141698 A1* | 5/2019 | Kim ....................... H04L 5/001 |
| 2019/0141742 A1* | 5/2019 | Zhou .................... H04L 5/0057 |
| 2019/0149380 A1* | 5/2019 | Babaei ............. H04W 72/1268 370/330 |
| 2020/0195399 A1* | 6/2020 | Sano .................... H04L 5/1469 |
| 2020/0221481 A1* | 7/2020 | Park ........................ H04W 4/80 |
| 2020/0229270 A1* | 7/2020 | Chatterjee ............ H04W 80/08 |
| 2021/0112547 A1* | 4/2021 | Yasukawa ......... H04W 72/1278 |

FOREIGN PATENT DOCUMENTS

| | | |
|---|---|---|
| CN | 104811409 A | 7/2015 |
| CN | 106911999 A | 6/2017 |
| CN | 107432008 A | 12/2017 |
| EP | 3026946 A1 | 6/2016 |
| WO | WO2016122242 A2 | 8/2016 |
| WO | WO2017107686 A1 | 6/2017 |

OTHER PUBLICATIONS

Source: Nokia Siemens Networks et al. Title: On signalling mechanisms to support dynamic TDD UL-DL reconfiguration. 3GPP Draft; R1-132297, 3rd generation partnership project(3GPP), Mobile competence centre; 650, route des lucioles; F-06921 Sophia-antipolis cedex; France, vol. RAN WG1, No. Fukuoka, Japan. May 20-May 24, 2013. May 11, 2013, XP050698063.
The European Search Report for EP patent application No. 21152279.2, dated Apr. 7, 2021.
The first office action for IN patent application No. 202017019150, dated Jun. 10, 2021.
Extended European Search Report for the corresponding EP patent application No. 18852759.2, dated Aug. 20, 2019.
International Search Report in international application No. PCT/CN2018/072265, dated Oct. 18, 2018.
Written Opinion of the International Search Authority in international application No. PCT/CN2018/072285, dated Oct. 18, 2018.
3GPP TSG RAN WG1 # 90bis Reno, US Nov. 27-Dec. 1, 2017, Agenda Item: 7.3.1.3, Source: LG Electronics, Title: Discussion on group common PDCCH, R1-1719919.
3GPP TSG RAN WG1 # 91 Reno, USA Nov. 27-Dec. 1, 2017, Source: CATT, Title: On semi-static and dynamic signaling of SFI, Agenda Item: 7.3.1.3. R1-1720192.
3GPP TSG RAN WG1 Meeting 91 Reno, USA Nov. 27-Dec. 1, 2017, Source: Panasonic, Title: Remaining details on group-common PDCCH, Agenda Item: 7.3.1.3, RI-1720495.
3GPP TSG RAN WG1 #91 Reno, USA Nov. 27-Dec. 1, 2017, Agenda Item: 7.3.1.3, Source: Qualcomm Incorporated, Title: Remaining issues on slot format indication, R1-1720677.
3GPP TSG RAN WG1 Meeting 91 Reno, USA Nov. 27-Dec. 1, 2017, Source: NTT DOCOMO, Inc., Title: Remaining details on group-common PDCCH, Agenda Item: 7.3.1.3, R1-1720813.
The first office action for the corresponding CN patent application No. 201880003171.6, dated Apr. 28, 2020.
The Communication pursuant to Article 94(3) EPC for EP patent application No. 18852759.2, dated May 18, 2020.
Qualcomm Incorporated.Offiine discussion on GC / PDCCH carrying SFI[online],3GPP TSG RAN WG1 #91 R1 , 1721674,2017.
NTT DOCOMO, Inc., Updated work plan for Rel-15 NR WI[oNline] and 3GPP TSG RAN WG1 #91 R1 Nov. 17, 2017 [ -1720787 or ], pp. 42-46.
Notice of Reasons for Refusal for Japanese Application No. 2020-538636, dated Dec. 14, 2021, (10 pages).
Sony, Remaining issues on pre-emption indicator[online],Nagoya, Japan, Sep. 18-21, 2017 R1-1716251(6 pages).
Singapore first written opinion. Application No. 11202006437T, dated May 9, 2022 (10 pages).
Decision of Refusal, Japanese Patent Application No. 2020-538636, dated Apr. 8, 2022 (4 pages).

* cited by examiner

Send, by A a network device sends, first configuration information and/or second configuration information to a terminal to enable the terminal to select a piece of configuration informationone piece of configuration information from the first configuration information and/or the second configuration information as target configuration information and receive first UL/DL configuration information on the basis ofbased on a time period corresponding to the target configuration information, the first configuration information being configured to indicate a first time period corresponding to a first search space and the second configuration information being configured to indicate a second time period corresponding to the first UL/DL configuration information    401

Fig. 4

Send, by A a network device, sends third configuration information to a terminal, the third configuration information being configured to determineconfigured for determining a time-domain starting location of first UL/DL configuration information in a target time period    501

Send, by The the network device sends, the first UL/DL configuration information at the time-domain starting location corresponding to the third configuration information    502

Fig. 5

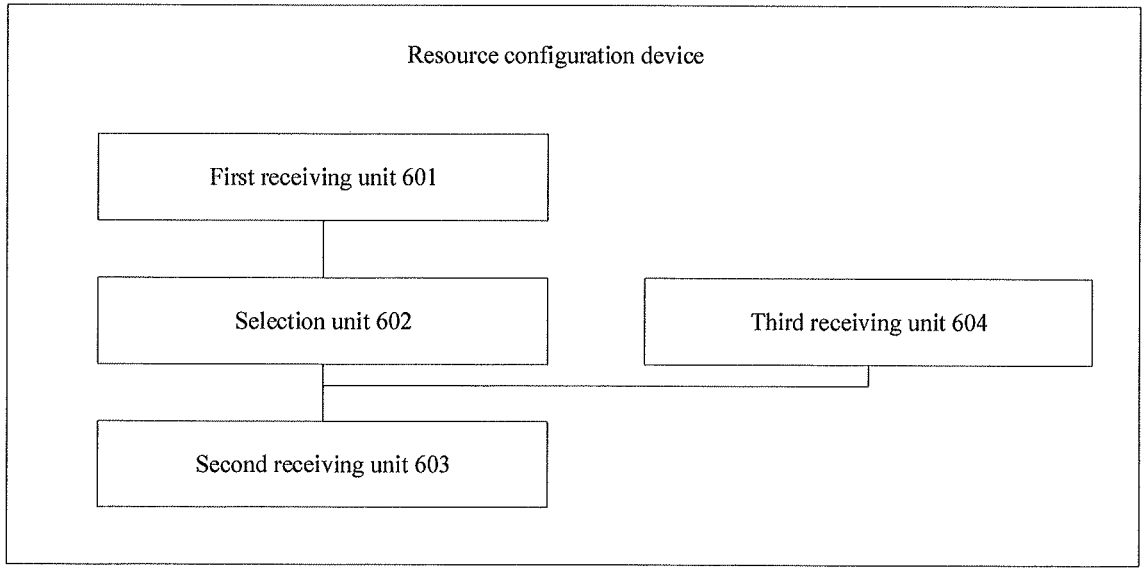

Fig. 6

RESOURCE CONFIGURATION METHOD AND DEVICE, AND COMPUTER STORAGE MEDIUM

RELATED APPLICATION

This application is an application under 35 U.S.C. 371 of International Application No. PCT/CN2018/072265 filed on Jan. 11, 2018, the entire contents of which are incorporated herein by reference.

TECHNICAL FIELD

The present disclosure relates to the technical field of wireless communication, and particularly to a resource configuration method and device, and a computer storage medium.

BACKGROUND

In a New Radio (NR) system, a slot or a symbol is taken as a scheduling unit. Each slot includes 14 Orthogonal Frequency Division Multiplexing (OFDM) symbols. The frame structure of an NR system changes flexibly. There may be one or more Down Link (DL) symbols, one or more Up Link (UL) symbols and one or more flexible symbols in one slot. The flexible symbol may also be called an unknown symbol, and the flexible symbol may be rewritten, through signaling, to be used for DL transmission or UL transmission.

A specific slot format may be configured through Slot Format Indication (SFI) information. A base station sends an SFI in a Group Common Physical Downlink Control Channel (GC-PDCCH). A network configures a search space for the GC-PDCCH, and the GC-PDCCH is transmitted in the search space configured by the network.

Generally, a network may configure corresponding time-domain information for a search space, for example, a monitoring period of the search space. The network may also configure corresponding time-domain information for dynamic SFI information, for example, a monitoring period of the dynamic SFI information. A present time-domain information configuration manner has the following problems.

1) The network, when configuring the monitoring period for the dynamic SFI information, may also configure the monitoring period for the search space where the dynamic SFI information is located, and in a case where the two monitoring periods are inconsistent, a terminal cannot determine how to receive the dynamic SFI information.

2) In a case where the network only configures the monitoring period for the dynamic SFI information but does not specify a specific time-domain resource location in one period, the terminal has to detect the dynamic SFI information at all possible time-domain locations, so that detection complexity of a receiver may be increased.

SUMMARY

Embodiments of the present disclosure provide a resource configuration method and device, and a computer storage medium, which may solve at least one of the above technical problems.

The embodiments of the present disclosure provide a resource configuration method, which may include that:

a terminal receives first configuration information and/or second configuration information sent by a network device, the first configuration information being configured to indicate a first time period corresponding to a first search space and the second configuration information being configured to indicate a second time period corresponding to first UL/DL configuration information; and the terminal selects one piece of configuration information from the first configuration information and/or the second configuration information as target configuration information, and receives the first UL/DL configuration information based on a time period corresponding to the target configuration information.

In the embodiments of the present disclosure, the operation that the terminal selects one piece of configuration information from the first configuration information and/or the second configuration information as the target configuration information may include that:

in a case where the terminal receives the first configuration information sent by the network device, the terminal determines the first configuration information as the target configuration information.

In the embodiments of the present disclosure, the operation that the terminal selects one piece of configuration information from the first configuration information and/or the second configuration information as the target configuration information may include that:

in a case where the terminal receives the second configuration information sent by the network device, the terminal determines the second configuration information as the target configuration information.

In the embodiments of the present disclosure, the operation that the terminal selects one piece of configuration information from the first configuration information and/or the second configuration information as the target configuration information may include that:

in a case where the terminal receives the first configuration information and second configuration information sent by the network device, the terminal determines the second configuration information as the target configuration information.

In the embodiments of the present disclosure, the method may further include that:

the terminal receives third configuration information sent by the network device, the third configuration information being configured for determining a time-domain starting location of the first UL/DL configuration information in the time period corresponding to the target configuration information; and the terminal starts receiving the first UL/DL configuration information from the time-domain starting location in the time period corresponding to the target configuration information.

In the embodiments of the present disclosure, that the third configuration information is configured for determining the time-domain starting location of the first UL/DL configuration information in the time period corresponding to the target configuration information may include that:

the third configuration information is configured for determining a starting slot location of the first UL/DL configuration information in the time period corresponding to the target configuration information; or, the third configuration information is configured for determining a slot offset of the first UL/DL configuration information relative to a reference slot in the time period corresponding to the target configuration information.

In the embodiments of the present disclosure, the reference slot may be determined based on one of the following manners:

the reference slot is determined based on a configuration of a protocol; or, the reference slot is determined based on a configuration of the network device.

In the embodiments of the present disclosure, the operation that the terminal receives the third configuration information sent by the network device may include that:

the terminal receives the third configuration information sent by the network device through Radio Resource Control (RRC) signaling or common control signaling or dedicated control signaling.

In the embodiments of the present disclosure, the first time period may be different from the second time period; or, the first time period may be the same as the second time period.

In the embodiments of the present disclosure, the first search space may be a search space for a GC-PDCCH, and the first UL/DL configuration, information may be dynamic SFI information, the dynamic SFI information being borne in the GC-PDCCH.

The embodiments of the present disclosure provide a resource configuration method, which may include that:

a terminal receives third configuration information sent by a network device, the third configuration information being configured for determining a time-domain starting location of first UL/DL configuration information in a target time period; and the terminal starts receiving the first UL/DL configuration information from the time-domain starting location in the target time period.

In the embodiments of the present disclosure, that the third configuration information is configured for determining the time-domain starting location of the first UL/DL configuration information in the target time period may include that:

the third configuration information is configured for determining a starting slot location of the first UL/DL configuration information in the target time period; or, the third configuration information is configured for determining a slot offset of the first UL/DL configuration information relative to a reference slot in the target time period.

In the embodiments of the present disclosure, the reference slot may be determined based on one of the following manners:

the reference slot is determined based on a configuration of a protocol; or, the reference slot is determined based on a configuration of the network device.

In the embodiments of the present disclosure, the operation that the terminal receives the third configuration information sent by the network device may include that:

the terminal receives the third configuration information sent by the network device through RRC signaling or common control signaling or dedicated control signaling.

In the embodiments of the present disclosure, the first UL/DL configuration information may be dynamic SFI information.

The embodiments of the present disclosure provide a resource configuration method, which may include that:

a network device sends first configuration information and/or second configuration information to a terminal to enable the terminal to select one piece of configuration information from the first configuration information and/or the second configuration information as target configuration information and receive first UL/DL configuration information based on a time period corresponding to the target configuration information, the first configuration information being configured to indicate a first time period corresponding to a first search space and the second configuration information being configured to indicate a second time period corresponding to the first UL/DL configuration information.

In the embodiments of the present disclosure, the method may further include that:

the network device sends third configuration information to the terminal, the third configuration information being configured for determining a time-domain starting location of the first UL/DL configuration information in the time period corresponding to the target configuration information.

In the embodiments of the present disclosure, that the third configuration information is configured for determining the time-domain starting location of the first UL/DL configuration information in the time period corresponding to the target configuration information may include that:

the third configuration information is configured for determining a starting slot location of the first UL/DL configuration information in the time period corresponding to the target configuration information; or, the third configuration information is configured for determining a slot offset of the first UL/DL configuration information relative to a reference slot in the time period corresponding to the target configuration information.

In the embodiments of the present disclosure, the reference slot may be determined based on one of the following manners:

the reference slot is determined based on a configuration of a protocol; or, the reference slot is determined based on a configuration of the network device.

In the embodiments of the present disclosure, the operation that the network device sends the third configuration information to the terminal may include that:

the network device sends the third configuration information to the terminal through RRC signaling or common control signaling or dedicated control signaling.

In the embodiments of the present disclosure, the first time period may be different from the second time period; or, the first time period may be the same as the second time period.

In the embodiments of the present disclosure, the first search space may be a search space for a GC-PDCCH, and the first UL/DL configuration information may be dynamic SFI information, the dynamic SFI information being borne in the GC-PDCCH.

The embodiments of the present disclosure provide a resource configuration method, which may include that:

a network device sends third configuration information to a terminal, the third configuration information being configured for determining a time-domain starting location of first UL/DL configuration information in a target time period; and the network device sends the first UL/DL configuration information at the time-domain starting location corresponding to the third configuration information.

In the embodiments of the present disclosure, that the third configuration information is configured for determining the time-domain starting location of the first UL/DL configuration information in the target time period may include that:

the third configuration information is configured for determining a starting slot location of the first UL/DL configuration information in the target time period; or, the third configuration information is configured for determining a slot offset of the first UL/DL configuration information relative to a reference slot in the target time period.

In the embodiments of the present disclosure, the reference slot may be determined based on one of the following manners:

the reference slot is determined based on a configuration of a protocol; or, the reference slot is determined based on a configuration of the network device.

In the embodiments of the present disclosure, the operation that the network device sends the third configuration information to the terminal may include that:

the network device sends the third configuration information to the terminal through RRC signaling or common control signaling or dedicated control signaling.

In the embodiments of the present disclosure, the first UL/DL configuration information may be dynamic SFI information.

The embodiments of the present disclosure provide a resource configuration device, which may include:

a first receiving unit, configured to receive first configuration information and/or second configuration information sent by a network device, the first configuration information being configured to indicate a first time period corresponding to a first search space and the second configuration information being configured to indicate a second time period corresponding to first UL/DL configuration information;

a selection unit, configured to select one piece of configuration information from the first configuration information and/or the second configuration information as target configuration information; and a second receiving unit, configured to receive first UL/DL configuration information based on a time period corresponding to the target configuration information.

In the embodiments of the present disclosure, the selection unit may be configured to determine, in a case where a terminal receives the first configuration information sent by the network device, the first configuration information as the target configuration information.

In the embodiments of the present disclosure, the selection unit may be configured to determine, in a case where the terminal receives the second configuration information sent by the network device, the second configuration information as the target configuration information.

In the embodiments of the present disclosure, the selection unit may be configured to determine, in a case where the terminal receives the first configuration information and second configuration information sent by the network device, the second configuration information as the target configuration information.

In the embodiments of the present disclosure, the device may further include:

a third receiving unit, configured to receive third configuration information sent by the network device, the third configuration information being configured for determining a time-domain starting location of the first UL/DL configuration information in the time period corresponding to the target configuration information; and the second receiving unit may be configured to start receiving the first UL/DL configuration information from the time-domain starting location in the time period corresponding to the target configuration information.

In the embodiments of the present disclosure, that the third configuration information is configured for determining the time-domain starting location of the first UL/DL configuration information in the time period corresponding to the target configuration information may include that:

the third configuration information is configured for determining a starting slot location of the first UL/DL configuration information in the time period corresponding to the target configuration information; or, the third configuration information is configured for determining a slot offset of the first UL/DL configuration information relative to a reference slot in the time period corresponding to the target configuration information.

In the embodiments of the present disclosure, the reference slot may be determined based on one of the following manners:

the reference slot is determined based on a configuration of a protocol; or, the reference slot is determined based on a configuration of the network device.

In the embodiments of the present disclosure, the third receiving unit may be configured to receive the third configuration information sent by the network device through RRC signaling or common control signaling or dedicated control signaling.

In the embodiments of the present disclosure, the first time period may be different from the second time period; or, the first time period may be the same as the second time period.

In the embodiments of the present disclosure, the first search space may be a search space for a GC-PDCCH, and the first UL/DL configuration information may be dynamic SFI information, the dynamic SFI information being borne in the GC-PDCCH.

The embodiments of the present disclosure provide a resource configuration device, which may include:

a third receiving unit, configured to receive third configuration information sent by a network device, the third configuration information being configured for determining a time-domain starting location of first UL/DL configuration information in a target time period; and a second receiving unit, configured to start receiving the first UL/DL configuration information from the time-domain starting location in the target time period.

In the embodiments of the present disclosure, that the third configuration information is configured for determining the time-domain starting location of the first UL/DL configuration information in the target time period may include that:

the third configuration information is configured for determining a starting slot location of the first UL/DL configuration information in the target time period; or, the third configuration information is configured for determining a slot offset of the first UL/DL configuration information relative to a reference slot in the target time period.

In the embodiments of the present disclosure, the reference slot may be determined based on one of the following manners:

the reference slot is determined based on a configuration of a protocol; or, the reference slot is determined based on a configuration of the network device.

In the embodiments of the present disclosure, the third receiving unit may be configured to receive the third configuration information sent by the network device through RRC signaling or common control signaling or dedicated control signaling.

In the embodiments of the present disclosure, the first UL/DL configuration information may be dynamic SFI information.

The embodiments of the present disclosure provide a resource configuration device, which may include:

a first sending unit, configured to send first configuration information and/or second configuration information to a terminal to enable the terminal to select one piece of configuration information from the first configuration information and/or the second configuration information as target configuration information and receive first UL/DL configuration information based on a time period corresponding to the target configuration information, the first configuration information being configured to indicate a first time period corresponding to a first search space and the second configuration information being configured to indicate a second time period corresponding to the first UL/DL configuration information.

In the embodiments of the present disclosure, the device may further include:

a second sending unit, configured to send third configuration information to the terminal, the third configuration information being configured for determining a time-domain starting location of the first UL/DL configuration information in the time period corresponding to the target configuration information.

In the embodiments of the present disclosure, that the third configuration information is configured for determining the time-domain starting location of the first UL/DL configuration information in the time period corresponding to the target configuration information may include that:

the third configuration information is configured for determining a starting slot location of the first UL/DL configuration information in the time period corresponding to the target configuration information; or, the third configuration information is configured for determining a slot offset of the first UL/DL configuration information relative to a reference slot in the time period corresponding to the target configuration information.

In the embodiments of the present disclosure, the reference slot may be determined based on one of the following manners:

the reference slot is determined based on a configuration of a protocol; or, the reference slot is determined based on a configuration of a network device.

In the embodiments of the present disclosure, the second sending unit may be configured to send the third configuration information to the terminal through RRC signaling or common control signaling or dedicated control signaling.

In the embodiments of the present disclosure, the first time period may be different from the second time period; or, the first time period may be the same as the second time period.

In the embodiments of the present disclosure, the first search space may be a search space for a GC-PDCCH, and the first UL/DL configuration information may be dynamic SFI information, the dynamic SFI information being borne in the GC-PDCCH.

The embodiments of the present disclosure provide a resource configuration device, which may include:

a second sending unit, configured to send third configuration information to a terminal, the third configuration information being configured for determining a time-domain starting location of first UL/DL configuration information in a target time period; and a third sending unit, configured to send the first UL/DL configuration information at the time-domain starting location corresponding to the third configuration information.

In the embodiments of the present disclosure, that the third configuration information is configured for determining the time-domain starting location of the first UL/DL configuration information in the target time period may include that:

the third configuration information is configured for determining a starting slot location of the first UL/DL configuration information in the target time period; or, the third configuration information is configured for determining a slot offset of the first UL/DL configuration information relative to a reference slot in the target time period.

In the embodiments of the present disclosure, the reference slot may be determined based on one of the following manners:

the reference slot is determined based on a configuration of a protocol; or, the reference slot is determined based on a configuration of a network device.

In the embodiments of the present disclosure, the second sending unit may be configured to send the third configuration information to the terminal through RRC signaling or common control signaling or dedicated control signaling.

In the embodiments of the present disclosure, the first UL/DL configuration information may be dynamic SFI information.

The embodiments of the present disclosure provide a computer storage medium, in which a computer-executable instruction may be stored, the computer-executable instruction being executed by a processor to implement the resource configuration method.

In the technical solutions of the embodiments of the present disclosure, the terminal receives the first configuration information and/or second configuration information sent by the network device, the first configuration information being configured to indicate the first time period corresponding to the first search space and the second configuration information being configured to indicate the second time period corresponding to the first UL/DL configuration information; and the terminal selects one piece of configuration information from the first configuration information and/or the second configuration information as the target configuration information, and receives the first UL/DL configuration information based on the time period corresponding to the target configuration information. By adopting the technical solutions of the embodiments of the present disclosure, under the condition that the network device configures a monitoring period or simultaneously configures two monitoring periods, the terminal may determine the specific time period based on which the dynamic SFI information is received. In addition, the network device not only configures the monitoring period but also monitors the time-domain starting location of the dynamic SFI information in the monitoring period, so that the terminal is not required to detect the dynamic SFI information at all possible time-domain locations, detection complexity of a receiver is reduced and, meanwhile, power consumption of the terminal is reduced.

BRIEF DESCRIPTION OF THE DRAWINGS

The drawings described here are adopted to provide a deeper understanding to the present disclosure and form a part of the application. Schematic embodiments of the present disclosure and descriptions thereof are adopted to explain the present disclosure and not intended to form improper limits to the present disclosure. In the drawings:

FIG. 4 is a fourth flowchart of a resource configuration method according to an embodiment of the present disclosure;

FIG. 5 is a fifth flowchart of a resource configuration method according to an embodiment of the present disclosure;

FIG. 6 is a first structure diagram of a resource configuration device according to an embodiment of the present disclosure;

DETAILED DESCRIPTION OF THE EMBODIMENTS

For making the technical solutions of the embodiments of the present disclosure convenient to understand, related configurations involved in the embodiments of the present disclosure will be described below.

The following slot format configuration manners are mainly adopted for a system.

1: Semi-persistent slot format configuration: semi-persistent slot format configuration further includes the following two manners:

1.1) cell-specific semi-persistent slot format configuration; and 1.2) User Equipment (UE)-specific semi-persistent slot format configuration.

2: Dynamic slot format indication.

In an implementation mode, a network configures a UL/DL slot structure by semi-persistent slot format configuration. Semi-persistent slot format configuration may indicate the numbers and locations of DL symbols, UL symbols and flexible symbols in one slot and the like. In another implementation mode, the network may send an SFI through dynamic signaling (for example, a GC-PDCCH) to dynamically indicate the slot structure. Herein, the SFI may indicate the DL symbols, the UL symbols and the flexible symbols. In addition, the SFI may dynamically indicate the slot structure in combination with semi-persistent slot format configuration. The DL symbols and UL symbols in the slot structure configured by semi-persistent slot format configuration may not be changed through the dynamic SFI, but the flexible symbols may be changed into DL symbols or UL symbols through the dynamic SFI or are not changed through the SFI.

Figure 1:
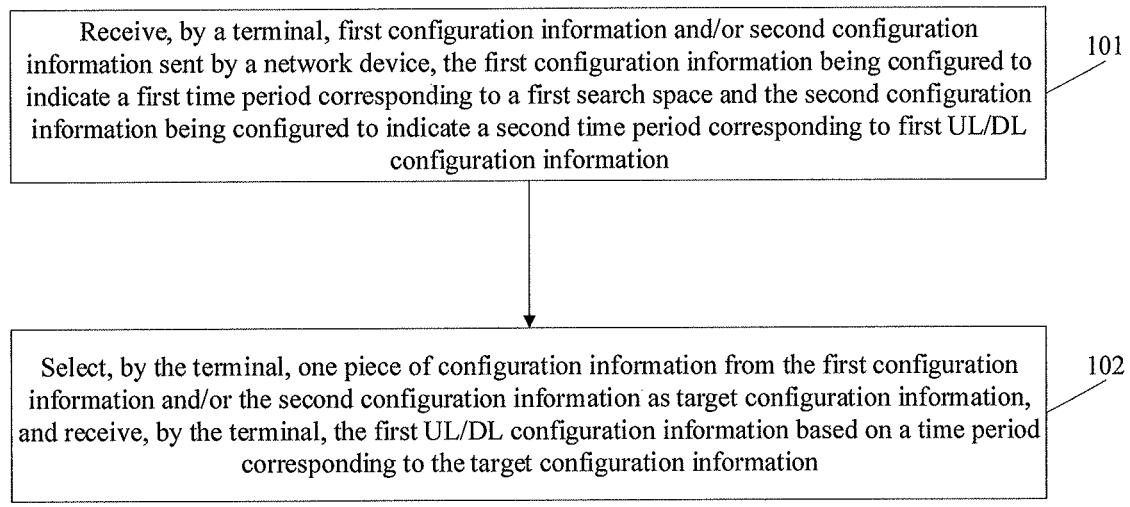
FIG. 1 is a first flowchart of a resource configuration method according to an embodiment of the present disclosure.

FIG. 1 is a first flowchart of a resource configuration method according to an embodiment of the present disclosure. As shown in FIG. 1, the resource configuration method includes the following operations shown in blocks 101 and 102.

In block 101, a terminal receives first configuration information and/or second configuration information sent by a network device, the first configuration information being configured to indicate a first time period corresponding to a first search space and the second configuration information being configured to indicate a second time period corresponding to first UL/DL configuration information.

In the embodiment of the present disclosure, the terminal may be any device capable of communicating with a network, for example, a mobile phone, a tablet computer, a notebook computer, a game console, a palm computer and a desktop computer.

In the embodiment of the present disclosure, the network device is a base station, for example, a gNB in a 5th-Generation (5G) system and an Evolved Node B (eNB) in a 4th-Generation (4G) system.

In the embodiment of the present disclosure, the first configuration information is configured to indicate the first time period corresponding to the first search space. In an implementation, the first search space is a search space for a GC-PDCCH, and the first time period refers to a monitoring period of the search space for the GC-PDCCH. For example, the first time period is 5 slots.

In the embodiment of the present disclosure, the second configuration information is configured to indicate the second time period corresponding to the first UL/DL configuration information. In an implementation mode, the first UL/DL configuration information is dynamic SFI information. Herein, the dynamic SFI information is borne in the GC-PDCCH. The second time period refers to a monitoring period of the dynamic SFI information. For example, the second time period is 4 slots.

In the embodiment of the present disclosure, the first time period may be different from the second time period. There are no limits made thereby. The first time period may be the same as the second time period.

In the embodiment of the present disclosure, the network device may configure one piece of configuration information, i.e., the first configuration information or the second configuration information, for the terminal. The network device may also simultaneously configure two pieces of configuration information, i.e., the first configuration information and the second configuration information, for the terminal.

In block 102, the terminal selects one piece of configuration information from the first configuration information and/or the second configuration information as target configuration information, and receives the first UL/DL configuration information based on a time period corresponding to the target configuration information.

In the embodiment of the present disclosure, the following conditions exist for the operation that the terminal determines the target configuration information (i.e., a target period) configured to receive the first UL/DL configuration information.

A first condition: in a case where the terminal receives the first configuration information sent by the network device, the terminal determines the first configuration information as the target configuration information.

For example, in a case where the network device does not configure a monitoring period T1 of the dynamic SFI information and the network device configures a monitoring period T2 of the search space where the dynamic SFI information is located, the terminal monitors the dynamic SFI information according to the period T2.

A second condition: in a case where the terminal receives the second configuration information sent by the network device, the terminal determines the second configuration information as the target configuration information.

For example, in a case where the network device configures the monitoring period T1 of the dynamic SFI information and does not configure the monitoring period T2 of the search space where the dynamic SFI information is located, the terminal monitors the dynamic SFI information according to the period T1.

A third condition: in a case where the terminal receives the first configuration information and second configuration information sent by the network device, the terminal determines the second configuration information as the target configuration information.

For example, in a case where the network device configures the monitoring period T1 of the dynamic SFI information and also configures the monitoring period T2 of the search space where the dynamic SFI information is located, the terminal monitors the dynamic SFI information according to the period T1. Herein, T1 may be equal to unequal to T2. In a case where T1=4 slots and T2=5 slots, the terminal monitors the dynamic SFI information according to T1=4 slots.

Figure 2:
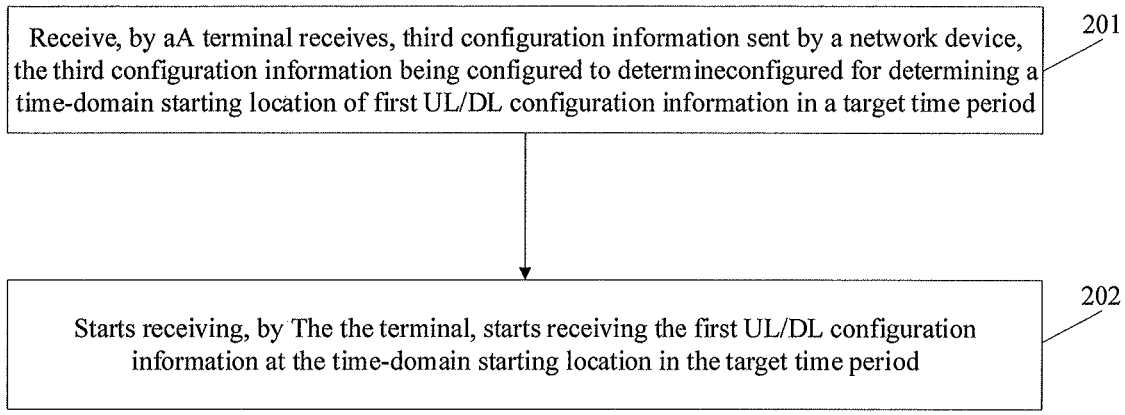
FIG. 2 is a second flowchart of a resource configuration method according to an embodiment of the present disclosure.

FIG. 2 is a second flowchart of a resource configuration method according to an embodiment of the present disclosure. As shown in FIG. 2, the resource configuration method includes the following operations shown in blocks 201 and 202.

In block 201, a terminal receives third configuration information sent by a network device, the third configuration information being configured for determining a time-domain starting location of first UL/DL configuration information in a target time period.

In the embodiment of the present disclosure, the first UL/DL configuration information is dynamic SFI information. Herein, the dynamic SFI information is borne in a GC-PDCCH.

In the embodiment of the present disclosure, that the third configuration information is configured for determining the time-domain starting location of the first UL/DL configuration information in the target time period includes that:

1) the third configuration information is configured for determining a starting slot location of the first UL/DL configuration information in the target time period; or, 2) the third configuration information is configured for determining a slot offset of the first UL/DL configuration information relative to a reference slot in the target time period.

For manner 1), the third configuration information directly configures the starting slot location of the dynamic SFI information in a time period. For example, a fourth slot in a time period is the starting slot location.

For manner 2), the third configuration information configures a slot offset of the dynamic SFI information relative to the reference slot in a time period, so that resources may be saved. Furthermore, the reference slot is determined based on one of the following manners:

1) the reference slot is determined based on a configuration of a protocol; or, 2) the reference slot is determined based on a configuration of the network device.

For example, a network configures a slot offset (SFI-offset-slot) of the dynamic SFI information in a monitoring period for the terminal. In an implementation mode, the slot offset is a slot offset relative to a first slot of the monitoring period (slot is taken as a unit).

For example, the network configures that the monitoring period is 5 slots, and a value range of the slot offset is {0, 1, 2, 3, 4}. Herein, the slot offset is relative to the first slot of the monitoring period. In an implementation mode, the first slot of the monitoring period may be determined through a slot index (Ind_slot) corresponding to a formula mod(Ind_slot, 5)=0, where mod(A, B) represents a remainder obtained by dividing B by A. According to the formula, it can be seen that slot 0, slot 5, slot 10, slot 15 represent the first slot of the monitoring period, and the slot offset is the number of offset slots relative to the first slot of the monitoring period in each monitoring period.

In the embodiment of the present disclosure, the terminal receives the third configuration information sent by the network device through RRC signaling or common control signaling or dedicated control signaling.

In block 202, the terminal starts receiving the first UL/DL configuration information from the time-domain starting location in the target time period.

Figure 3:
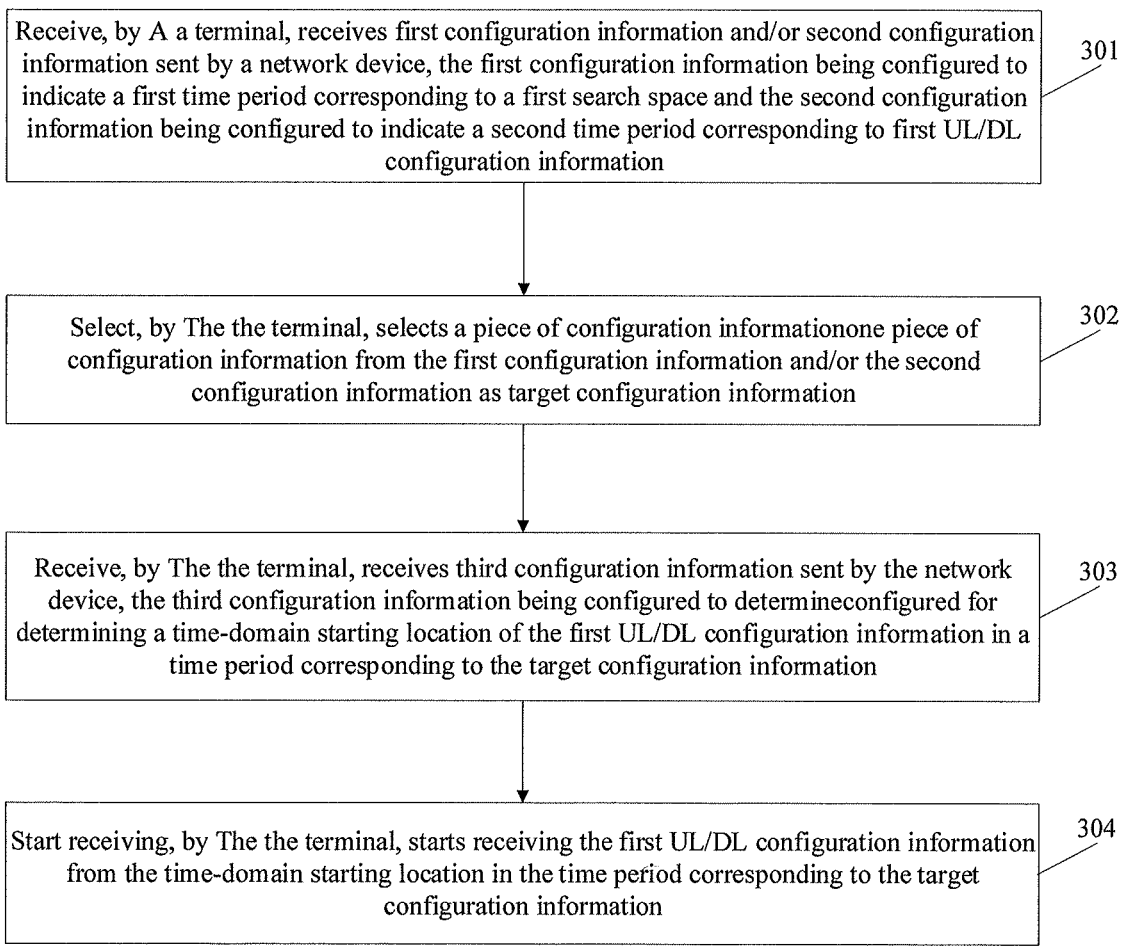
FIG. 3 is a third flowchart of a resource configuration method according to an embodiment of the present disclosure.

FIG. 3 is a third flowchart of a resource configuration method according to an embodiment of the present disclosure. As shown in FIG. 3, the resource configuration method includes the following operations shown in blocks 301 to 304.

In block 301, a terminal receives first configuration information and/or second configuration information sent by a network device, the first configuration information being configured to indicate a first time period corresponding to a first search space and the second configuration information being configured to indicate a second time period corresponding to first UL/DL configuration information.

In block 302, the terminal selects one piece of configuration information from the first configuration information and/or the second configuration information as target configuration information.

In the embodiment of the present disclosure, the operation that the terminal selects one piece of configuration information from the first configuration information and/or the second configuration information as the target configuration information includes the following conditions.

A first condition: in a case where the terminal receives the first configuration information sent by the network device, the terminal determines the first configuration information as the target configuration information.

A second condition: in a case where the terminal receives the second configuration information sent by the network device, the terminal determines the second configuration information as the target configuration information.

A third condition: in a case where the terminal receives the first configuration information and second configuration information sent by the network device, the terminal determines the second configuration information as the target configuration information.

In block 303, the terminal receives third configuration information sent by the network device, the third configuration information being configured for determining a time-domain starting location of the first UL/DL configuration information in the time period corresponding to the target configuration information.

In the embodiment of the present disclosure, that the third configuration information is configured for determining the time-domain starting location of the first UL/DL configuration information in the time period corresponding to the target configuration information includes that:

1) the third configuration information is configured for determining a starting slot location of the first UL/DL configuration information in the time period corresponding to the target configuration information; or, 2) the third configuration information is configured for determining a slot offset of the first UL/DL configuration information relative to a reference slot in the time period corresponding to the target configuration information.

In the embodiment of the present disclosure, the reference slot is determined based on one of the following manners:

1) the reference slot is determined based on a configuration of a protocol; or, 2) the reference slot is determined based on a configuration of the network device.

In the embodiment of the present disclosure, the terminal receives the third configuration information sent by the network device through RRC signaling or common control signaling or dedicated control signaling.

In block 304, the terminal starts receiving the first UL/DL configuration information from the time-domain starting location in the time period corresponding to the target configuration information.

In the solution of the embodiment of the present disclosure, the first search space is a search space for a GC-PDCCH, and the first UL/DL configuration information is dynamic SFI information. Herein, the dynamic SFI information is borne in the GC-PDCCH.

FIG. 4 is a fourth flowchart of a resource configuration method according to an embodiment of the present disclosure. As shown in FIG. 4, the resource configuration method includes the following operation shown in block 401.

In block 401, a network device sends first configuration information and/or second configuration information to a terminal to enable the terminal to select one piece of configuration information from the first configuration information and/or the second configuration information as target configuration information and receive first UL/DL configuration information based on a time period corresponding to the target configuration information, the first configuration information being configured to indicate a first time period corresponding to a first search space and the second configuration information being configured to indicate a second time period corresponding to the first UL/DL configuration information.

In an implementation mode, the network device sends third configuration information to the terminal, the third configuration information being configured for determining a time-domain starting location of the first UL/DL configuration information in the time period corresponding to the target configuration information.

In the embodiment of the present disclosure, that the third configuration information is configured for determining the time-domain starting location of the first UL/DL configuration information in the time period corresponding to the target configuration information includes that:

1) the third configuration information is configured for determining a starting slot location of the first UL/DL configuration information in the time period corresponding to the target configuration information; or, 2) the third configuration information is configured for determining a slot offset of the first UL/DL configuration information relative to a reference slot in the time period corresponding to the target configuration information.

In the embodiment of the present disclosure, the reference slot is determined based on one of the following manners:

1) the reference slot is determined based on a configuration of a protocol; or, 2) the reference slot is determined based on a configuration of the network device.

In the embodiment of the present disclosure, the network device sends the third configuration information to the terminal through RRC signaling or common control signaling or dedicated control signaling.

In the embodiment of the present disclosure, the first time period is different from the second time period. Or, the first time period is the same as the second time period.

In the embodiment of the present disclosure, the first search space is a search space for a GC-PDCCH, and the first UL/DL configuration information is dynamic SFI information. Herein, the dynamic SFI information is borne in the GC-PDCCH.

FIG. 5 is a fifth flowchart of a resource configuration method according to an embodiment of the present disclosure. As shown in FIG. 5, the resource configuration method includes the following operations shown in blocks 501 and 502.

In block 501, a network device sends third configuration information to a terminal, the third configuration information being configured for determining a time-domain starting location of first UL/DL configuration information in a target time period.

In the embodiment of the present disclosure, that the third configuration information is configured for determining the time-domain starting location of the first UL/DL configuration information in the target time period includes that:

1) the third configuration information is configured for determining a starting slot location of the first UL/DL configuration information in the target time period; or, 2) the third configuration information is configured for determining a slot offset of the first UL/DL configuration information relative to a reference slot in the target time period.

In the embodiment of the present disclosure, the reference slot is determined based on one of the following manners:

1) the reference slot is determined based on a configuration of a protocol; or, 2) the reference slot is determined based on a configuration of the network device.

In the embodiment of the present disclosure, the network device sends the third configuration information to the terminal through RRC signaling or common control signaling or dedicated control signaling.

In block 502, the network device sends the first UL/DL configuration information at the time-domain starting location corresponding to the third configuration information.

In the embodiment of the present disclosure, the first UL/DL configuration information is dynamic SFI information.

FIG. 6 is a first structure diagram of a resource configuration device according to an embodiment of the present disclosure. The device is applied to a terminal and, as shown in FIG. 6, includes:

a first receiving unit 601, configured to receive first configuration information and/or second configuration information sent by a network device, the first configuration information being configured to indicate a first time period corresponding to a first search space and the second configuration information being configured to indicate a second time period corresponding to first UL/DL configuration information;

a selection unit 602, configured to select one piece of configuration information from the first configuration information and/or the second configuration information as target configuration information; and a second receiving unit 603, configured to receive first UL/DL configuration information based on a time period corresponding to the target configuration information.

In an implementation mode, the selection unit 602 may be configured to determine, in a case where the terminal receives the first configuration information sent by the network device, the first configuration information as the target configuration information.

In an implementation mode, the selection unit 602 may be configured to determine, in a case where the terminal receives the second configuration information sent by the network device, the second configuration information as the target configuration information.

In an implementation mode, the selection unit 602 may be configured to determine, in a case where the terminal receives the first configuration information and second configuration information sent by the network device, the second configuration information as the target configuration information.

In an implementation mode, the device further includes:

a third receiving unit 604, configured to receive third configuration information sent by the network device, the third configuration information being configured for determining a time-domain starting location of the first UL/DL configuration information in the time period corresponding to the target configuration information.

The second receiving unit 603 is configured to start receiving the first UL/DL configuration information from the time-domain starting location in the time period corresponding to the target configuration information.

In an implementation mode, that the third configuration information is configured for determining the time-domain starting location of the first UL/DL configuration information in the time period corresponding to the target configuration information includes that:

the third configuration information is configured for determining a starting slot location of the first UL/DL configuration information in the time period corresponding to the target configuration information; or, the third configuration information is configured for determining a slot offset of the first UL/DL configuration information relative to a reference slot in the time period corresponding to the target configuration information.

In an implementation mode, the reference slot is determined based on one of the following manners:

the reference slot is determined based on a configuration of a protocol; or, the reference slot is determined based on a configuration of the network device.

In an implementation mode, the third receiving unit 604 is configured to receive the third configuration information sent by the network device through RRC signaling or common control signaling or dedicated control signaling.

In an implementation mode, the first time period is different from the second time period; or, the first time period is the same as the second time period.

In an implementation mode, the first search space is a search space for a GC-PDCCH, and the first UL/DL configuration information is dynamic SFI information, the dynamic SFI information being borne in the GC-PDCCH.

Those skilled in the art should know that functions realized by each unit in the resource configuration device shown in FIG. 6 may be understood with reference to related descriptions in the resource configuration method. The functions of each unit in the resource configuration device shown in FIG. 6 may be realized through a program running on a processor, and may also be realized through a specific logical circuit.

Figure 7:
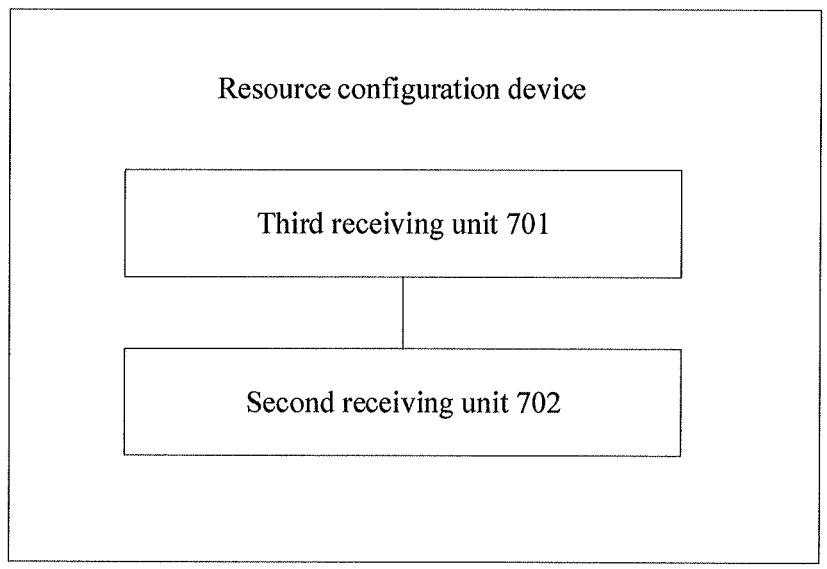
FIG. 7 is a second structure diagram of a resource configuration device according to an embodiment of the present disclosure.

FIG. 7 is a second structure diagram of a resource configuration device according to an embodiment of the present disclosure. The device is applied to a terminal and, as shown in FIG. 7, includes:

a third receiving unit 701, configured to receive third configuration information sent by a network device, the third configuration information being configured for determining a time-domain starting location of first UL/DL configuration information in a target time period; and a second receiving unit 702, configured to start receiving the first UL/DL configuration information from the time-domain starting location in the target time period.

In an implementation mode, that the third configuration information is configured for determining the time-domain starting location of the first UL/DL configuration information in the target time period includes that:

the third configuration information is configured for determining a starting slot location of the first UL/DL configuration information in the target time period; or, the third configuration information is configured for determining a slot offset of the first UL/DL configuration information relative to a reference slot in the target time period.

In an implementation mode, the reference slot is determined based on one of the following manners:

the reference slot is determined based on a configuration of a protocol; or, the reference slot is determined based on a configuration of the network device.

In an implementation mode, the third receiving unit 701 is configured to receive the third configuration information sent by the network device through RRC signaling or common control signaling or dedicated control signaling.

In an implementation mode, the first UL/DL configuration information is dynamic SFI information.

Those skilled in the art should know that functions realized by each unit in the resource configuration device shown in FIG. 7 may be understood with reference to related descriptions in the resource configuration method. The functions of each unit in the resource configuration device shown in FIG. 7 may be realized through a program running on a processor, and may also be realized through a specific logical circuit.

Figure 8:
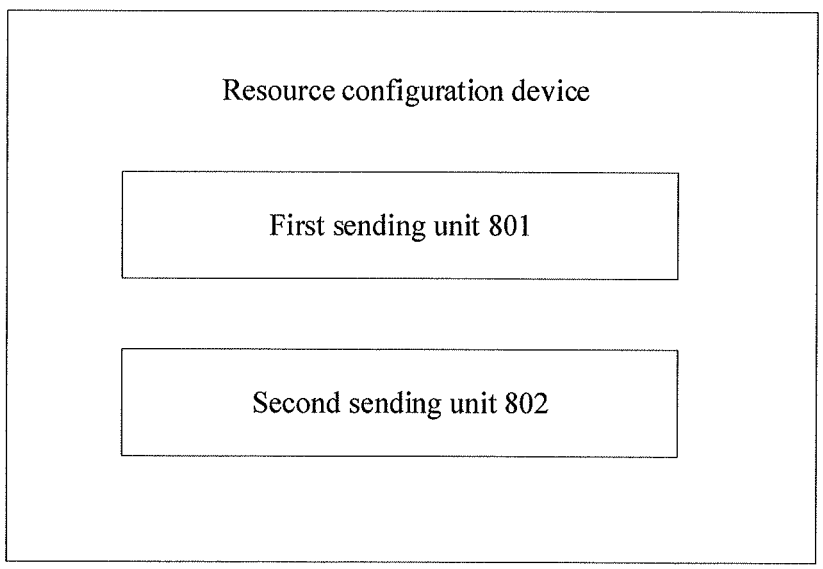
FIG. 8 is a third structure diagram of a resource configuration device according to an embodiment of the present disclosure.

FIG. 8 is a third structure diagram of a resource configuration device according to an embodiment of the present disclosure. The device is applied to a network device (for example, a base station) and, as shown in FIG. 8, includes:

a first sending unit 801, configured to send first configuration information and/or second configuration information to a terminal to enable the terminal to select one piece of configuration information from the first configuration information and/or the second configuration information as target configuration information and receive first UL/DL configuration information based on a time period corresponding to the target configuration information, the first configuration information being configured to indicate a first time period corresponding to a first search space and the second configuration information being configured to indicate a second time period corresponding to the first UL/DL configuration information.

In an implementation mode, the device further includes:

a second sending unit 802, configured to send third configuration information to the terminal, the third configuration information being configured for determining a time-domain starting location of the first UL/DL configuration information in the time period corresponding to the target configuration information.

In an implementation mode, that the third configuration information is configured for determining the time-domain starting location of the first UL/DL configuration information in the time period corresponding to the target configuration information includes that:

the third configuration information is configured for determining a starting slot location of the first UL/DL configuration information in the time period corresponding to the target configuration information; or, the third configuration information is configured for determining a slot offset of the first UL/DL configuration information relative to a reference slot in the time period corresponding to the target configuration information.

In an implementation mode, the reference slot is determined based on one of the following manners:

the reference slot is determined based on a configuration of a protocol; or, the reference slot is determined based on a configuration of the network device.

In an implementation mode, the second sending unit 802 is configured to send the third configuration information to the terminal through RRC signaling or common control signaling or dedicated control signaling.

In an implementation mode, the first time period is different from the second time period; or, the first time period is the same as the second time period.

In an implementation mode, the first search space is a search space for a GC-PDCCH, and the first UL/DL configuration information is dynamic SFI information, the dynamic SFI information being borne in the GC-PDCCH.

Those skilled in the art should know that functions realized by each unit in the resource configuration device shown in FIG. 8 may be understood with reference to related descriptions in the resource configuration method. The functions of each unit in the resource configuration device shown in FIG. 8 may be realized through a program running on a processor, and may also be realized through a specific logical circuit.

Figure 9:
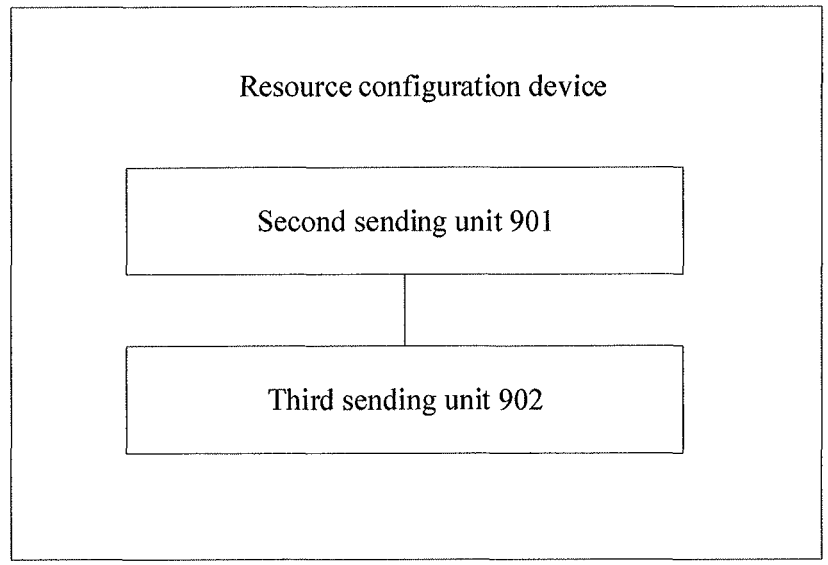
FIG. 9 is a fourth structure diagram of a resource configuration device according to an embodiment of the present disclosure.

FIG. 9 is a fourth structure diagram of a resource configuration device according to an embodiment of the present disclosure. The device is applied to a network device (for example, a base station) and, as shown in FIG. 9, includes:

a second sending unit 901, configured to send third configuration information to a terminal, the third configuration information being configured for determining a time-domain starting location of first UL/DL configuration information in a target time period; and a third sending unit 902, configured to send the first UL/DL configuration information at the time-domain starting location corresponding to the third configuration information.

In an implementation mode, that the third configuration information is configured for determining the time-domain starting location of the first UL/DL configuration information in the target time period includes that:

the third configuration information is configured for determining a starting slot location of the first UL/DL configuration information in the target time period; or, the third configuration information is configured for determining a slot offset of the first UL/DL configuration information relative to a reference slot in the target time period.

In an implementation mode, the reference slot is determined based on one of the following manners:

the reference slot is determined based on a configuration of a protocol; or, the reference slot is determined based on a configuration of the network device.

In an implementation mode, the second sending unit 901 is configured to send the third configuration information to the terminal through RRC signaling or common control signaling or dedicated control signaling.

In an implementation mode, the first UL/DL configuration information is dynamic SFI information.

Those skilled in the art should know that functions realized by each unit in the resource configuration device shown in FIG. 9 may be understood with reference to related descriptions in the resource configuration method. The functions of each unit in the resource configuration device shown in FIG. 9 may be realized through a program running on a processor, and may also be realized through a specific logical circuit.

When being implemented in a form of software functional module and sold or used as an independent product, the resource configuration device of the embodiments of the present disclosure may also be stored in a computer-readable storage medium. Based on such an understanding, the technical solutions of the embodiments of the present disclosure substantially or parts making contributions to a related art may be embodied in form of software product. The computer software product is stored in a storage medium, including a plurality of instructions configured to enable a computer device (Which may be a personal computer, a server, a network device or the like) to execute all or part of the method in each embodiment of the present disclosure. The storage medium includes various media capable of storing program codes such as a U disk, a mobile hard disk, a Read-Only Memory (ROM), a magnetic disk or an optical disk. Therefore, the embodiments of the present disclosure are not limited to any specific hardware and software combination.

Correspondingly, the embodiments of the present disclosure also provide a computer storage medium, in which a computer-executable instruction is stored, the computer-executable instruction being executed by a processor to implement the resource configuration method of the embodiments of the present disclosure.

Figure 10:
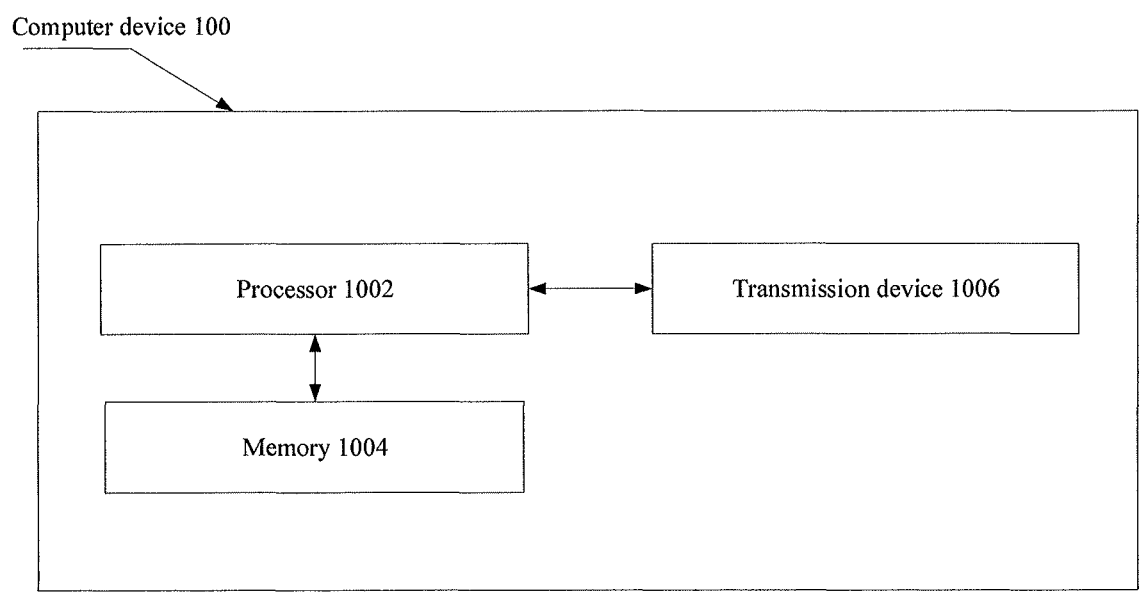
FIG. 10 is a structure diagram of a computer device according to an embodiment of the present disclosure.

FIG. 10 is a structure diagram of a computer device according to an embodiment of the present disclosure. The computer device may be a terminal and may also be a network device. As shown in FIG. 10, the computer device 100 may include one or more (only one is illustrated in the figure) processors 1002 (the processor 1002 may include, but not limited to, a processing device such as a Micro Controller Unit (MCU) or a Field Programmable Gate Array (FPGA)), a memory 1004 configured to store data and a transmission device 1006 configured for a communication function. Those of ordinary skill in the art should know that the structure shown in FIG. 10 is only schematic and not intended to limit the structure of the electronic device. For example, the computer device 100 may further include components more or fewer than the components shown in FIG. 10 or adopts a configuration different from that shown in FIG. 10.

The memory 1004 may be configured to store a software program of application software and a module, for example, a program instruction/module corresponding to the method in the embodiments of the present disclosure. The processor 1002 runs the software program and module stored in the memory 1004, thereby executing various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. Examples of the network include, but not limited to, the Internet, the Intranet, a Local Area Network (LAN), a mobile communication network and a combination thereof.

The transmission device 1006 is configured to receive or send data through a network. An exemplary of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recorded in the embodiments of the present disclosure may be freely combined without conflicts.

In some embodiments provided by the present disclosure, it is to be understood that the disclosed method and intelligent device may be implemented in another manner. The device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the present disclosure may be integrated into a second processing unit, each unit may also serve as an independent unit and two or more than two units may also be integrated into a unit. The integrated unit may be implemented in a hardware form and may also be implemented in form of a combination of hardware and a software functional unit.

The above is only the exemplary implementation mode of the present disclosure and not intended to limit the scope of protection of the present disclosure. Any variations or replacements apparent to those skilled in the art within the technical scope disclosed by the present disclosure shall fall within the scope of protection of the present disclosure.

What is claimed is:

1. A resource configuration method, comprising:
receiving, by a terminal, first configuration information and/or second configuration information sent by a network device, the first configuration information being configured to indicate a first time period corresponding to a first search space and the second configuration information being configured to indicate a second time period corresponding to first Up Link (UL)/Down Link (DL) configuration information; and
selecting, by the terminal, one piece of configuration information from the first configuration information and/or the second configuration information as target configuration information, and receiving, by the terminal, the first UL/DL configuration information based on a time period corresponding to the target configuration information;
wherein the first search space is a search space for a Group Common Physical Downlink Control Channel (GC-PDCCH), and the first UL/DL configuration information is dynamic Slot Format Indication (SFI) information,
the dynamic SFI information being borne in the GC-PDCCH.

2. The method as claimed in claim 1, wherein selecting, by the terminal, one piece of configuration information from the first configuration information and/or the second configuration information as the target configuration information comprises:
in a case where the terminal receives the first configuration information sent by the network device, determining, by the terminal, the first configuration information as the target configuration information,
or,
in a case where the terminal receives the second configuration information sent by the network device, determining, by the terminal, the second configuration information as the target configuration information;
or,
in a case where the terminal receives the first configuration information and second configuration information sent by the network device, determining, by the terminal, the second configuration information as the target configuration information.

3. The method as claimed in claim 1, further comprising:
receiving, by the terminal, third configuration information sent by the network device, the third configuration information being configured for determining a time-domain starting location of the first UL/DL configuration information in the time period corresponding to the target configuration information; and
starting receiving, by the terminal, the first UL/DL configuration information from the time-domain starting location in the time period corresponding to the target configuration information.

4. The method as claimed in claim 3, wherein that the third configuration information is configured for determining the time-domain starting location of the first UL/DL configuration information in the time period corresponding to the target configuration information comprises that:
the third configuration information is configured for determining a starting slot location of the first UL/DL configuration information in the time period corresponding to the target configuration information; or, the third configuration information is configured for determining a slot offset of the first UL/DL configuration information relative to a reference slot in the time period corresponding to the target configuration information.

5. The method as claimed in claim 3, wherein receiving, by the terminal, the third configuration information sent by the network device comprises:
receiving, by the terminal, the third configuration information sent by the network device through Radio Resource Control (RRC) signaling or common control signaling or dedicated control signaling.

6. A resource configuration device, comprising:
at least one processor, and
a computer readable storage medium, coupled to the at least one processor and storing computer executable instructions which, when being executed by the at least one processor, cause the at least one processor to carry out following actions:
receiving first configuration information and/or second configuration information sent by a network device, the first configuration information being configured to indicate a first time period corresponding to a first search space and the second configuration information being configured to indicate a second time period corresponding to first Up Link (UL)/Down Link (DL) configuration information;
selecting one piece of configuration information from the first configuration information and/or the second configuration information as target configuration information; and
receiving first UL/DL configuration information based on a time period corresponding to the target configuration information;
wherein the first search space is a search space for a Group Common Physical Downlink Control Channel (GC-PDCCH), and the first UL/DL configuration information is dynamic Slot Format Indication (SFI) information,
the dynamic SFI information being borne in the GC-PDCCH.

7. The device as claimed in claim 6, wherein selecting one piece of configuration information from the first configuration information and/or the second configuration information as target configuration information comprises:
determining, in a case where a terminal receives the first configuration information sent by the network device, the first configuration information as the target configuration information,
or,
determining, in a case where the terminal receives the second configuration information sent by the network device, the second configuration information as the target configuration information;
or,
determining, in a case where the terminal receives the first configuration information and second configuration information sent by the network device, the second configuration information as the target configuration information.

8. The device as claimed in claim 6, wherein the at least one processor further carries out following action:
receiving third configuration information sent by the network. device, the third configuration information being configured for determining a time-domain starting location of the first configuration information in the time period corresponding to the target configuration infbrmaton,
wherein receiving first UL/DL configuration information based on a time period corresponding to the target configuration information comprises:
starting receiving the first UL/DL configuration information from the time-domain starting location in the time period corresponding to the target configuration information.

9. The device as claimed in claim 8, wherein that the third configuration information is configured for determining. the time-domain starting location of the first UL/DL configuration information in the time period corresponding to the target configuration information comprises that:
the third configuration information is configured for determining a starting slot location of the first UL/DL configuration information in the time period corresponding to the target configuration information; or,
the third configuration information is configured for determining a slot offset of the first UL/DL configuration information relative to a reference slot in the time period corresponding to the target configuration information.

10. The device as claimed in claim 9, wherein the reference slot is determined based on one of the following manners:
the reference slot is determined based on a configuration of a protocol; or,
the reference slot is determined based on a configuration of the network device.

11. The device as claimed in claim 8, wherein receiving the third configuration information sent by the network device comprises:
receiving the third configuration information sent by the network device through Radio Resource Control (RRC) signaling or common control signaling or dedicated control signaling.

* * * * *